(12) United States Patent
Iwasaki et al.

(10) Patent No.: US 6,169,998 B1
(45) Date of Patent: *Jan. 2, 2001

(54) METHOD OF AND A SYSTEM FOR GENERATING MULTIPLE-DEGREED DATABASE FOR IMAGES

(75) Inventors: Masajiro Iwasaki; Yingjieh Huang, both of Kanagawa (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/111,458

(22) Filed: Jul. 7, 1998

(30) Foreign Application Priority Data

Jul. 7, 1997 (JP) .................................................... 9-181610

(51) Int. Cl.$^7$ ...................................................... G06F 17/30
(52) U.S. Cl. ........................ 707/530; 707/500; 707/502; 707/515
(58) Field of Search .................................... 707/104, 500, 707/502, 515, 530

(56) References Cited

U.S. PATENT DOCUMENTS 5,031,121  *  7/1991  Iwai et al. ............................. 707/515
5,325,297  *  6/1994  Bird et al. ............................. 707/530
5,845,288  * 12/1998  Syeda-Mahmood .................. 707/102
5,913,221  *  6/1999  Kano et al. ........................... 707/530
6,043,819  *  3/2000  LeBrun et al. ....................... 345/418

FOREIGN PATENT DOCUMENTS 3-62169  3/1991  (JP) .

OTHER PUBLICATIONS

Masahiro Shibata et al. , Associate Retrieval Method for Image Database, vol. J73–D–II, No. 4, pp. 526–534 (1990).
Myron Flickner et al.,Query by Image and Video Content: The QBIC System pp. 24–32 (1995).

* cited by examiner

Primary Examiner—Wayne Amsbury
Assistant Examiner—William Trinh
(74) Attorney, Agent, or Firm—Knoble & Yoshida, LLC

(57) ABSTRACT

Ranked database is generated for referring to images. The database contains references or key text to images, and the references are ranked for predetermined degrees of relevance to the images.

21 Claims, 21 Drawing Sheets

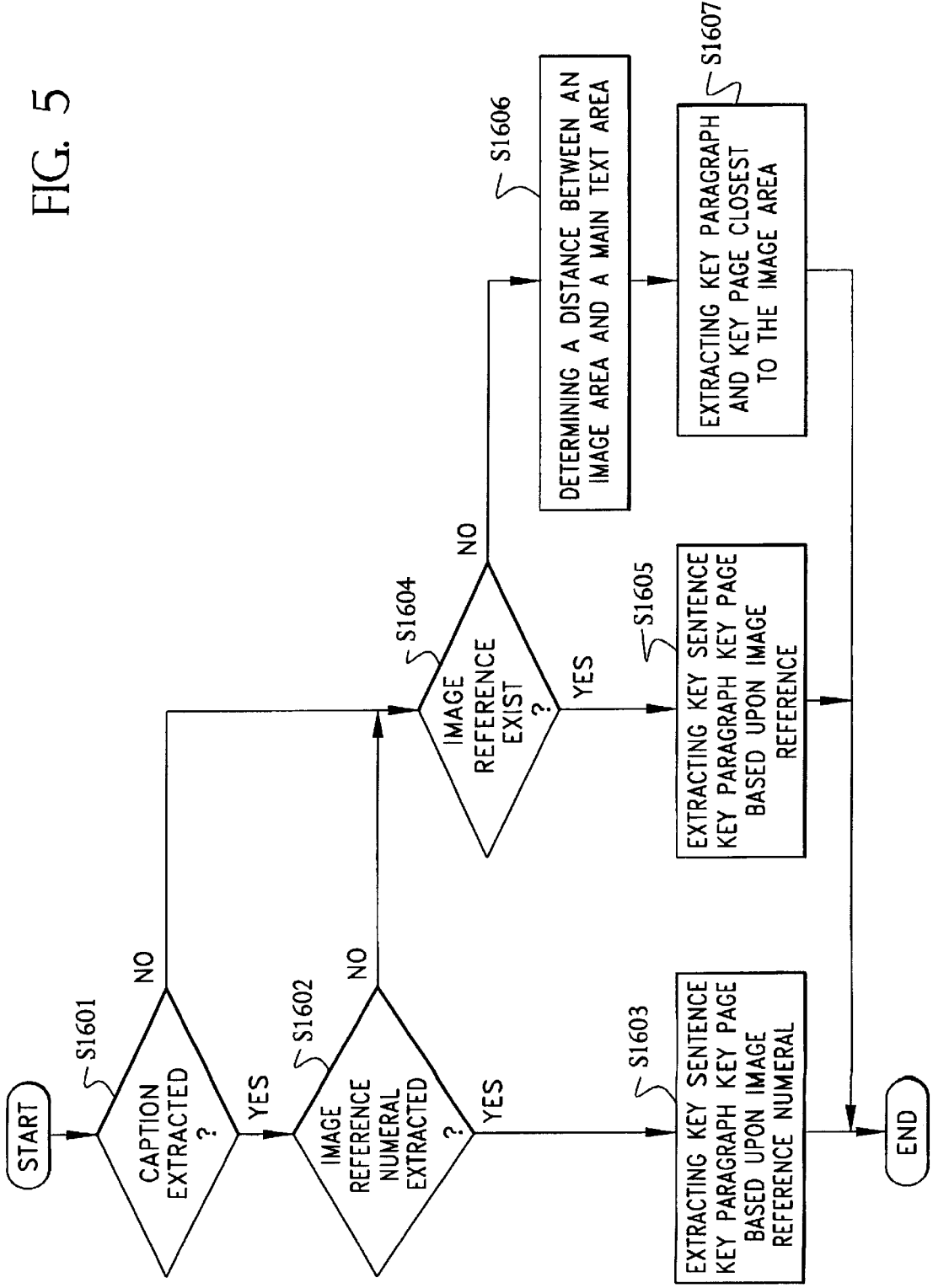

FIG. 6A
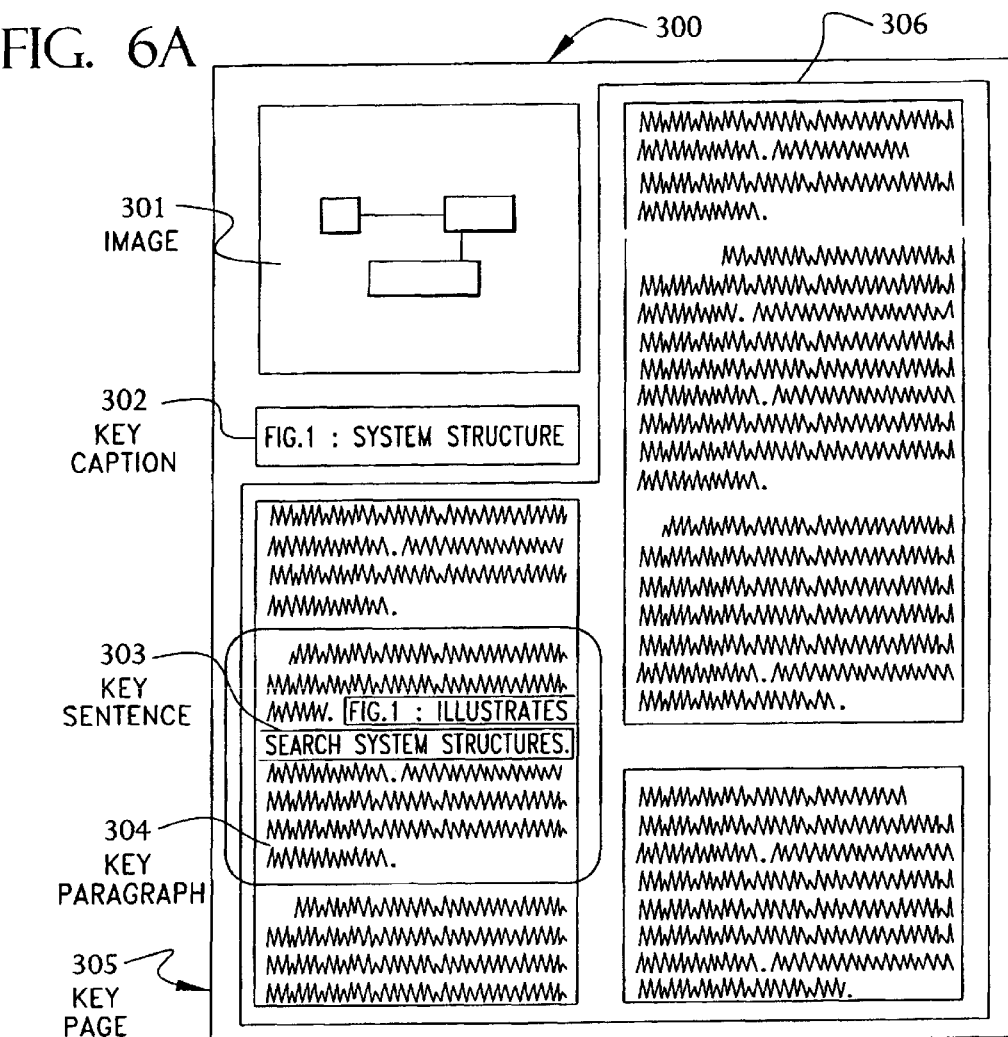
- 301 IMAGE
- 302 KEY CAPTION — FIG.1 : SYSTEM STRUCTURE
- 303 KEY SENTENCE — FIG.1 : ILLUSTRATES SEARCH SYSTEM STRUCTURES.
- 304 KEY PARAGRAPH
- 305 KEY PAGE
- 306
DATABASE
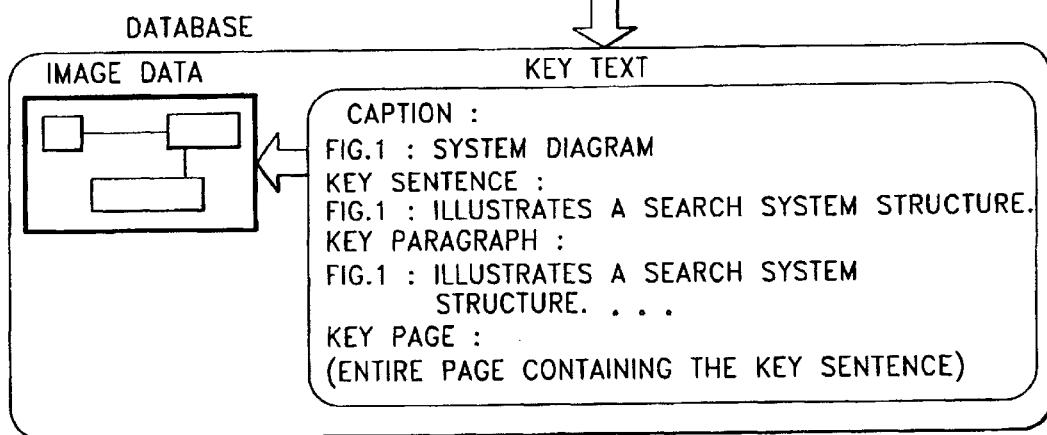
IMAGE DATA
KEY TEXT
CAPTION :
FIG.1 : SYSTEM DIAGRAM
KEY SENTENCE :
FIG.1 : ILLUSTRATES A SEARCH SYSTEM STRUCTURE.
KEY PARAGRAPH :
FIG.1 : ILLUSTRATES A SEARCH SYSTEM STRUCTURE. . . .
KEY PAGE :
(ENTIRE PAGE CONTAINING THE KEY SENTENCE)
FIG. 6B

FIG. 22

METHOD OF AND A SYSTEM FOR GENERATING MULTIPLE-DEGREED DATABASE FOR IMAGES

FIELD OF THE INVENTION

The current invention is generally related to a method of and a system for generating ranked database for references to images, and more particularly related to the database which contains references or key text to images of predetermined degrees of relevance.

BACKGROUND OF THE INVENTION

In the area of image processing, there have been attempts to organize images so as to retrieve a particular image in an efficient manner. In particular, a large number of images including pictures, figures, table, diagrams and flow charts appear in primarily textual documents, and these images are independently searched. In order to efficiently retrieve a particular image, prior art attempts have focused upon three major approaches in creating an image search database.

One approach is to extract image characteristic information from the images themselves. For example, "Query by Image and Video Content: The QBIC System," Computer, IEEE (1995) discloses that databases are generated based upon color, shape and texture and images are subsequently searched based upon these visual clues. Although these visually orientated search keys are intuitive, complex searches involving other high level non-visual descriptions are not feasible.

A second prior art approach involves additional keys or references that are individually associated to each of the images. These keys or references are determined by a person who generates an image search database as disclosed in Proceedings For Academy of Electronics Information Communication, D-II Vol. J73-D-II No. 4, pp. 526–534 (1990). Although the key words can be hierarchical for complex searches, if the key words are not properly assigned at the database generation, the images may not be properly retrieved.

Lastly, a third approach utilizes a part of images to determine proper key words. For example, Japanese Patent Laid Publication Hei 3-62169 discloses that a certain portion such as a header or a legend in a graphical or non-textual image is optically scanned and converted into textual character data. The converted characters are used as key words or labels for the images for later retrieval. The same patent publication also discloses the links between image references in a text portion and the images.

The above described approaches are useful in retrieving images. To further promote efficiency in image retrievals and searches, it is desired to extensively use associated text as key words or relevant text portions in image database generation.

SUMMARY OF THE INVENTION

In order to solve the above and other problems, according to a first aspect of the current invention, a method of generating a database for images, includes inputting input document data containing text data and image data, the image data further including images; selecting relevant text portions of the text data according to predetermined degrees of relevancy for each of the images, the predetermined degrees of the relevancy each defining a level of relevance in reference to the images; and storing the relevant text portions and the images.

According to a second aspect of the current invention, a system for generating a database for images, includes an input unit for inputting input document data containing text data and image data, the image data further including images; a processing unit connected to the input unit for selecting relevant text portions of the text data according to predetermined degrees of relevancy for each of the images, the predetermined degrees of the relevancy each defining a level of relevance in reference to the images; and a storage unit connected to the processing unit for storing the relevant text portions and the images.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 5 is a flow chart illustrating steps in one preferred method of the overview text database generation according to the current invention.

FIGS. 6A–6B are an exemplary document image which includes an image area as well as a main text area.

FIG. 22 illustrates yet another exemplary display window.

DETAILED DESCRIPTION OF THE PREFERRED EMBODIMENT(S)

Figure 1:
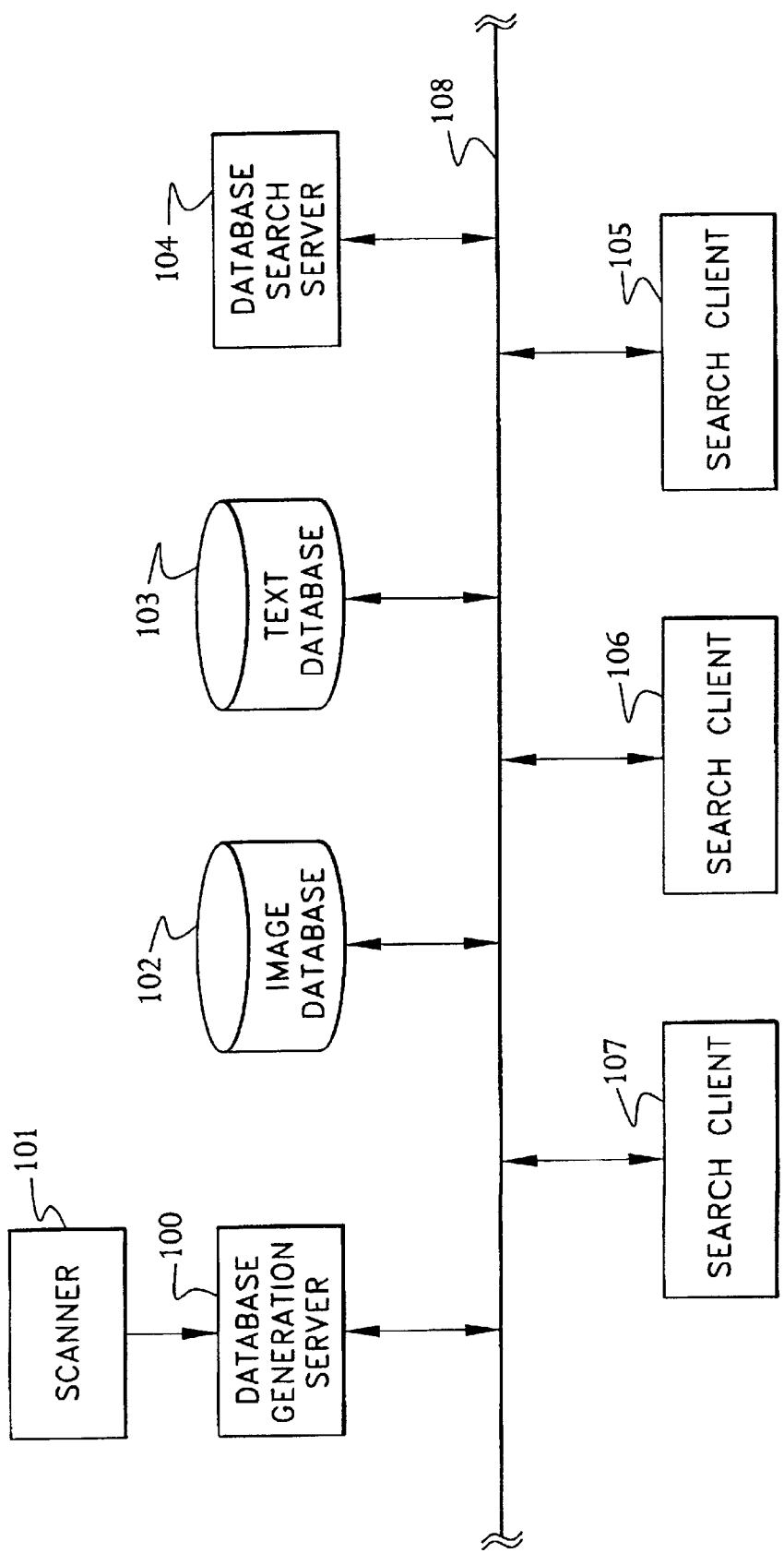
FIG. 1 is a diagram illustrating one preferred embodiment of the system for generating and searching an image database according to the current invention.

Referring now to the drawings, wherein like reference numerals designate corresponding structure throughout the views, and referring in particular to FIG. 1, one preferred embodiment of the system for generating and searching an image database according to the current invention includes a scanner 101 for scanning documents, a database generating server 100 for generating an image database 102 and a text database 103 from the scanned documents, search clients 105 through 107 requests a search for an image in the databases 102 and 103, and a search server 104 receives the request from the search clients 105 through 107 and processes the request to retrieve the requested image from the image database 102 based upon a match in the text search in the text database 103. The above described units are all connected with each other via a telecommunication line or bus 108. An alternative preferred embodiment of the system for generating and searching an image database according to the current invention combines the database generation server 100 and the database search server 104 into one server to generate as well as search the image database.

Figure 2:
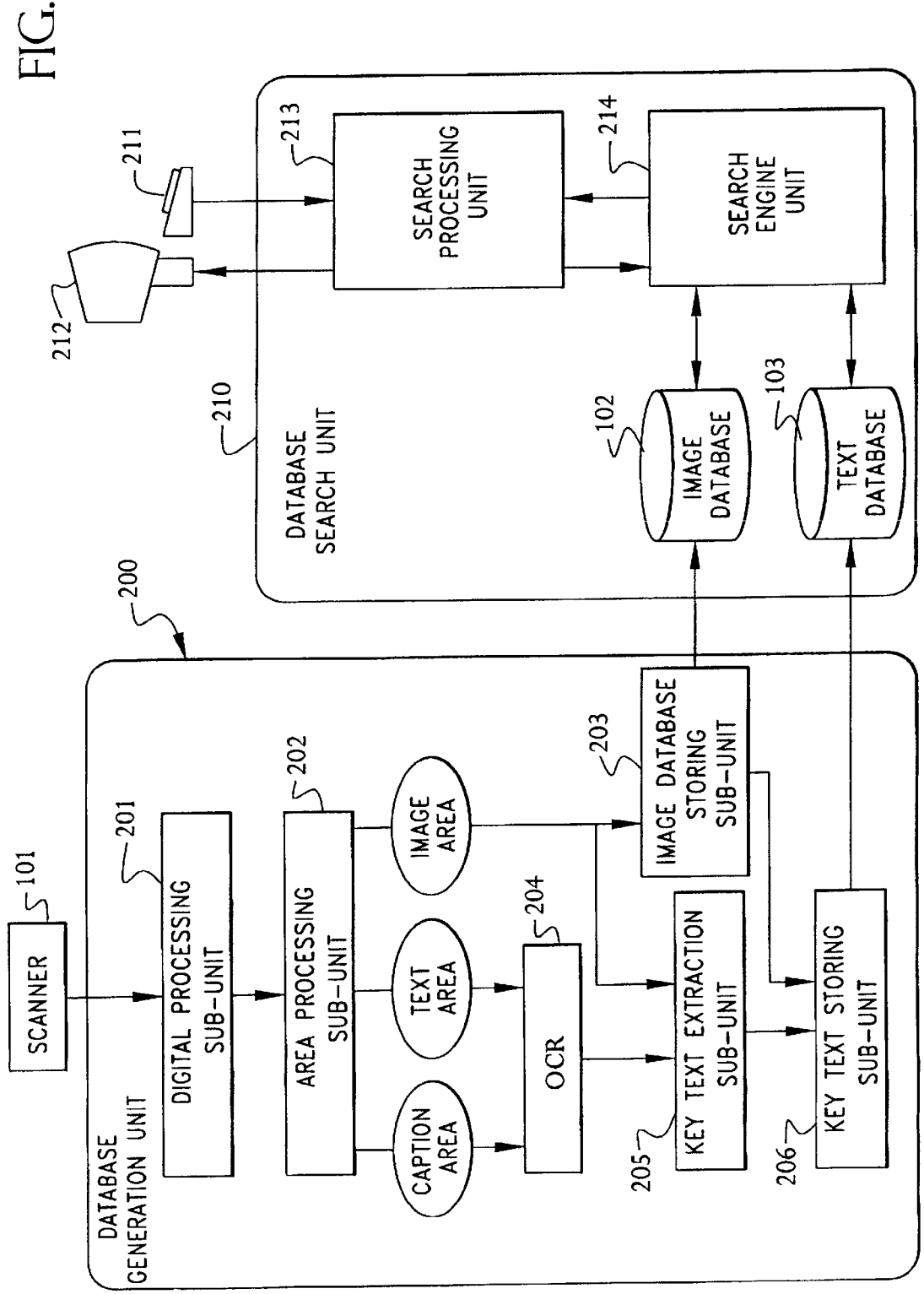
FIG. 2 is a diagram illustrating a second preferred embodiment of the system for generating and searching an image database according to the current invention.

Now referring to FIG. 2, a second preferred embodiment of the system for generating and searching an image database according to the current invention generally includes a scanner 101 for inputting documents, a database generation unit 200 for processing the input document, a database search unit 210, a display unit 212, and a keyboard 212. The database generation unit 200 further includes a digital processing sub-unit 201, an area processing sub-unit 202, an optical character recognition (OCR) sub-unit 204 for optically recognizing characters, a key text extraction sub-unit 205 for extracting key text, an image database storing sub-unit 203, and a key text storing sub-unit 206. The digital processing sub-unit 201 digitizes the scanned document data to generate digitized document data. In the alternative, digitized data as in SGML or HTML format is also used, and there is no need for scanning or digitizing. The area processing sub-unit 202 divides the digitized document data into a predetermined set of areas such as text areas and non-text areas. The text areas include caption areas and main text areas while the non-text areas include image areas which contain images. The OCR sub-unit 204 optically recognizes character images and convert them into text data. The key text extraction sub-unit 205 extracts predetermined degrees of relevant text portions for each image. In general, the key text includes a caption that contains a reference numeral for an image area, a key sentence that contains the reference numeral for the image, a key paragraph that contains the key sentence and a key page that contains the key paragraph. The image database storing sub-unit 203 and the key text storing sub-unit 206 respectively store image data and corresponding text data.

Still referring to FIG. 2, the database search unit 210 further includes a search processing unit 213, a search engine unit 214, an image database 102 and a text database unit 103. After the image and text databases 102, 103 have been generated, the processing unit 213 receives a search key for searching a particular image, and the search or search word is inputted into the search processing unit 213 via an input device such as a keyboard 211. The search engine 214 searches a match for the search key in the text database 103 and the corresponding image is retrieved from the image database 102. The search engine 214 outputs the search results to the search processing unit 213, and the search processing unit 213 in turn outputs the results to a display unit 212.

Figure 3:
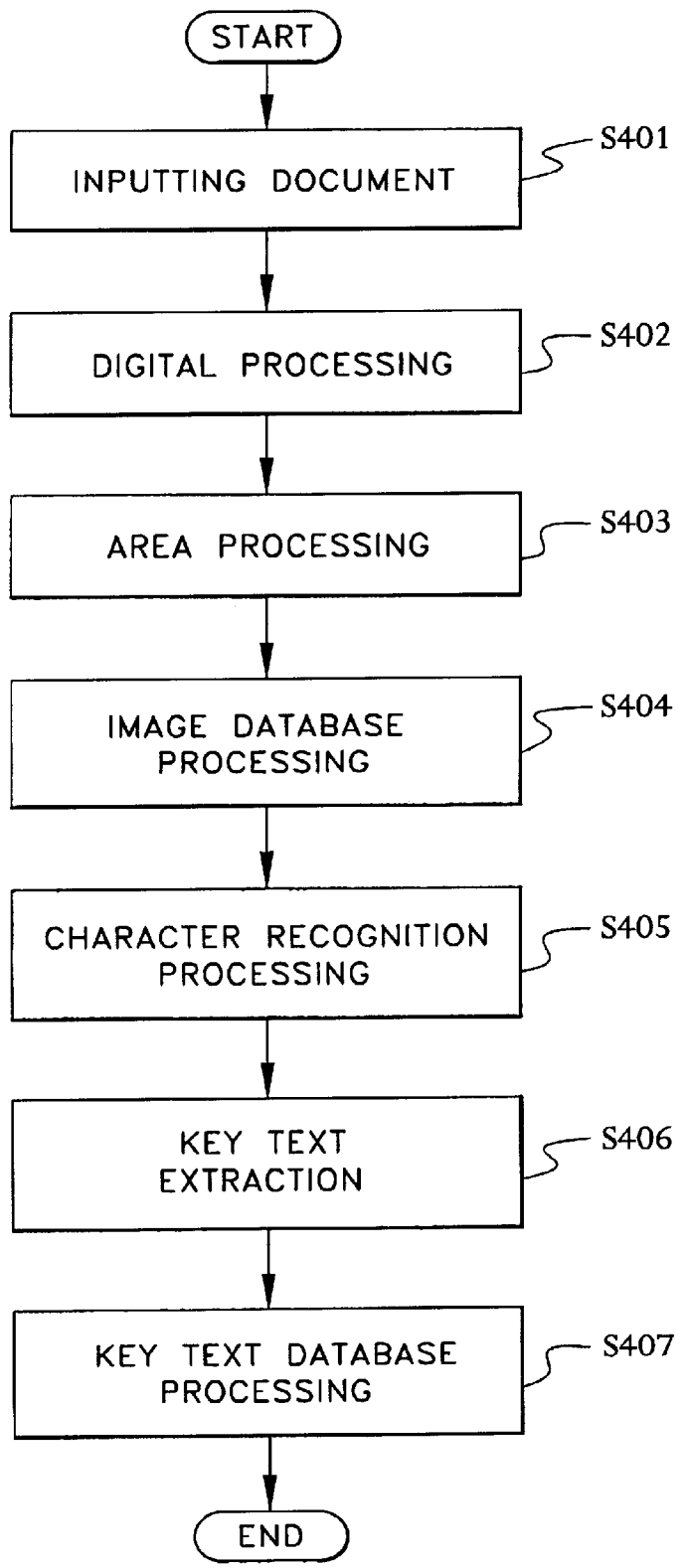
FIG. 3 is a flow chart illustrating some general steps of one preferred process according to the current invention.

To further illustrate the database generation process, some general steps are illustrated in a flow chart of FIG. 3. In a step 401, document is inputted. Isolated noise is removed, and a rotational angle is corrected. The inputted document is digitized in a step 402. After color document data is converted into hue, intensity and (HIS) data, based upon a predetermined intensity threshold, the digitized data is generated. The digitized data is then divided into areas according to a predetermined rule in a step 403. By connecting the on pixels of the digitized data, a minimal circumscribing rectangle is determined for each continuous element. If the size of the minimal circumscribing rectangle exceeds a predetermined size threshold, a minimally circumscribed rectangular area is considered as an image area. On the other hand, the minimally circumscribing rectangular size does not exceed the threshold, the area is considered as a non-image area. In a step 404, an entire image of every page containing each of the image areas is stored with a corresponding identification number, a corresponding location of the image in the document page as well as a thumbnail or reduced image. Based upon the area division results, the character image is optically recognized as characters in a step 405. After the character or text data is generated, key text is extracted in a step 406. As described above, the key text includes a caption that contains a reference numeral for an image area, a key sentence that contains the reference numeral for the image, a key paragraph that contains the key sentence and a key page that contains the key paragraph. The key text is then stored in a text database in a step 407.

Figure 4:
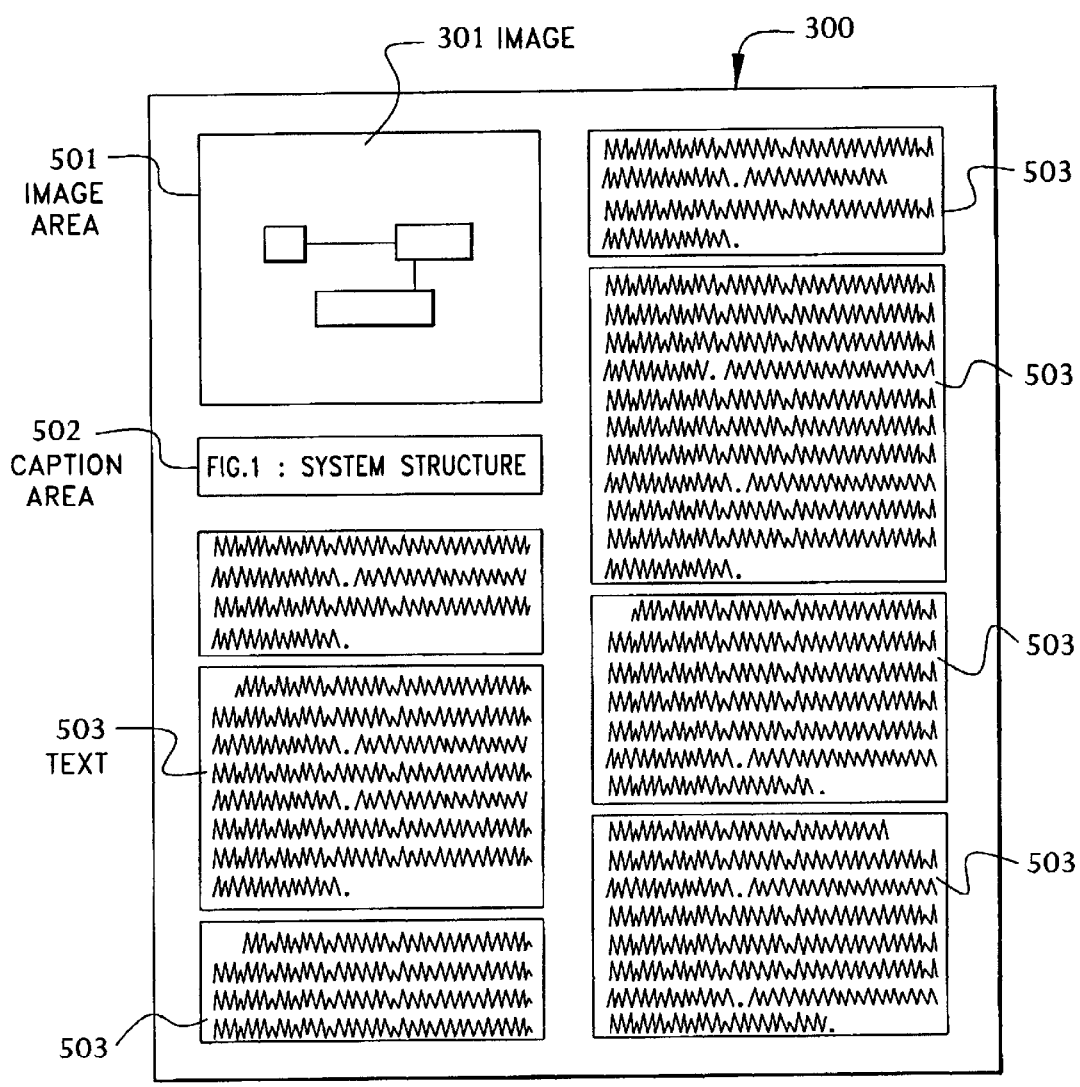
FIG. 4 illustrates a document to exemplify sub-divided areas.

In order to describe some detailed steps involved in the text database generation, a document image is illustrated to exemplify sub-divided areas in FIG. 4. The exemplary document 300 includes an image area 501 containing an non-text image such as a figure, a table and a picture; a caption area 502 containing a legend or brief description of the image; and main text areas 503 containing text images. Although the caption area 502 does not necessarily exist in a document, when the caption area 502 exists, it usually contains a reference to the image and some brief description or clarification of the image. For example, if the image area 501 contains a diagram or a figure which is numbered as "FIG. 1," the caption area 502 also contains a numerical reference, "FIG. 1" to refer to the figure. Usually, the same numerical reference is also used in the text areas 503 to further describe the figure.

Now referring to FIG. 5, steps in one preferred method of the overview text database generation according to the current invention include a series of checks to determine how the key text is selected. In a step S1601, assuming an image area exists, it is determined whether a caption exits in a document image. If the caption exists, it is checked whether a reference numeral exists in the caption in a step 1602. If the reference numeral exist in the caption, based upon the reference numeral, a corresponding key sentence, a corresponding key paragraph and a corresponding key page are extracted. On the other hand, if neither a caption nor a reference numeral exists, an image reference word is sought in a step 1604. The image reference word includes a predetermined set of words such as "fig.," "table" and "picture." If any of these predetermined words is found in the step 1604, a corresponding key sentence, a corresponding key paragraph and a corresponding key page are identified. On the other hand, none of the predetermined words is found, in a step 1606, a distance between an image area and each of adjacent text areas is determined. Based upon the closest distance, a key paragraph as well as its corresponding key page are selected in a step 1607.

To diagramatically illustrate some of the above steps, referring to FIG. 6A, a document image 300 includes an image area 301 as well as a main text area 306. When the image area 301 is identified, a corresponding caption area 302 is determined, and a portion of the caption containing a reference numeral such as "FIG. 1" is selected. Based upon the image reference numeral, the main text area 306 is searched for a key sentence 303 containing the image reference numeral. After the key sentence 303 is identified, a corresponding key paragraph 304 as well as a corresponding a key page 305 are extracted for generating a text database.

FIG. 6B illustrates a part of the text as well as image databases that include the key text for the corresponding image. These corresponding entries are linked between the two databases. In the text database, the key text has up to four different levels of information. In general, the caption is brief and the most closely related or relevant to the corresponding image. In other words, the caption does not usually contain irrelevant information. On the other hand, a key page is generally longer than the caption and contains information that is not as much relevant as that of the caption. The key sentence and the key paragraph are each a continuous spectrum between the caption and the key page. Thus, when a textual search is performed on the text database, depending upon which part of the spectrum is used to find a match in a textual search, a result varies in relevance. That is, a broader the scope in the text database, the less accurate the result becomes. Consequently, a corresponding image is accordingly selected. Although the image and text databases are independent in this example, the two databases is combined in another example.

Figure 7:
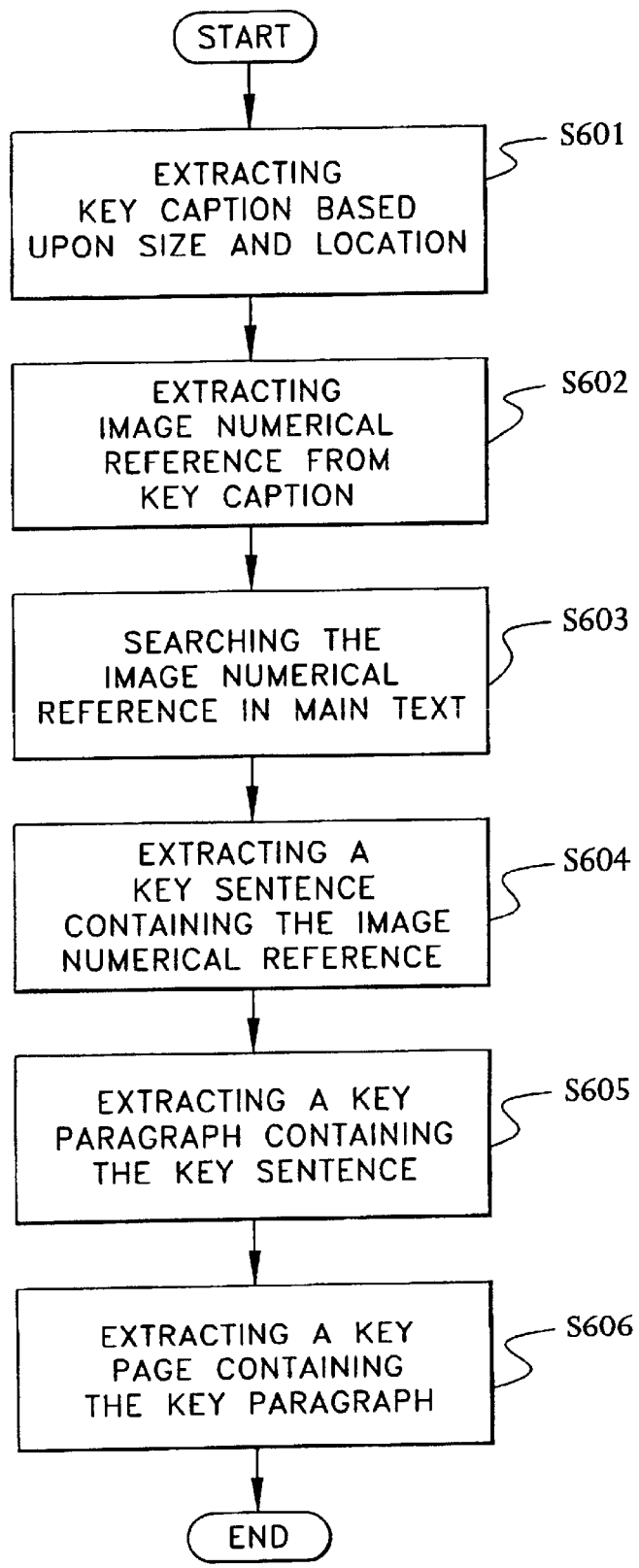
FIG. 7 is a flow chart illustrating some steps involved in the caption capturing process.

Now referring to FIG. 7, some steps involved in the caption capturing process are described in a flow chart. Steps in one preferred method of the caption capturing according to the current invention involves a predetermined set of checks before the key text is extracted. In a step 601, the subdivided areas are examined for determining a caption area based upon a size of the minimally circumscribing rectangle and the distance between the rectangle and the image area. For example, the predetermined size of the rectangle is approximately large enough to contain up to three rows of legend text lines. Of course, the predetermined size depends upon the font size and line spacing. In addition, in order for the area to qualify for a caption area, the distance to the image area has to be under a predetermined distance. For example, the distance is defined in terms of the number of pixels.

Still referring to FIG. 7, after the area is determined as a caption area, in a step 602, an image reference numeral and associated reference words are extracted. For example, a set of registered reference words includes "fig," "figure," "table," "diagram," and "photo." These reference words are each checked against text in the caption. If there is a match, a reference numeral associated with the matched reference word is extracted. As a result, for example, "FIG 12" is extracted as a pair of the reference word and the associated reference numeral. In a step 603, the extracted reference pair is searched in main text areas. When the reference pair is found in the main text area, a sentence containing the reference pair is extracted as a key sentence in a step 604. Similarly a key paragraph and a key page are respectively extracted in steps 605 and 606.

Figure 8:
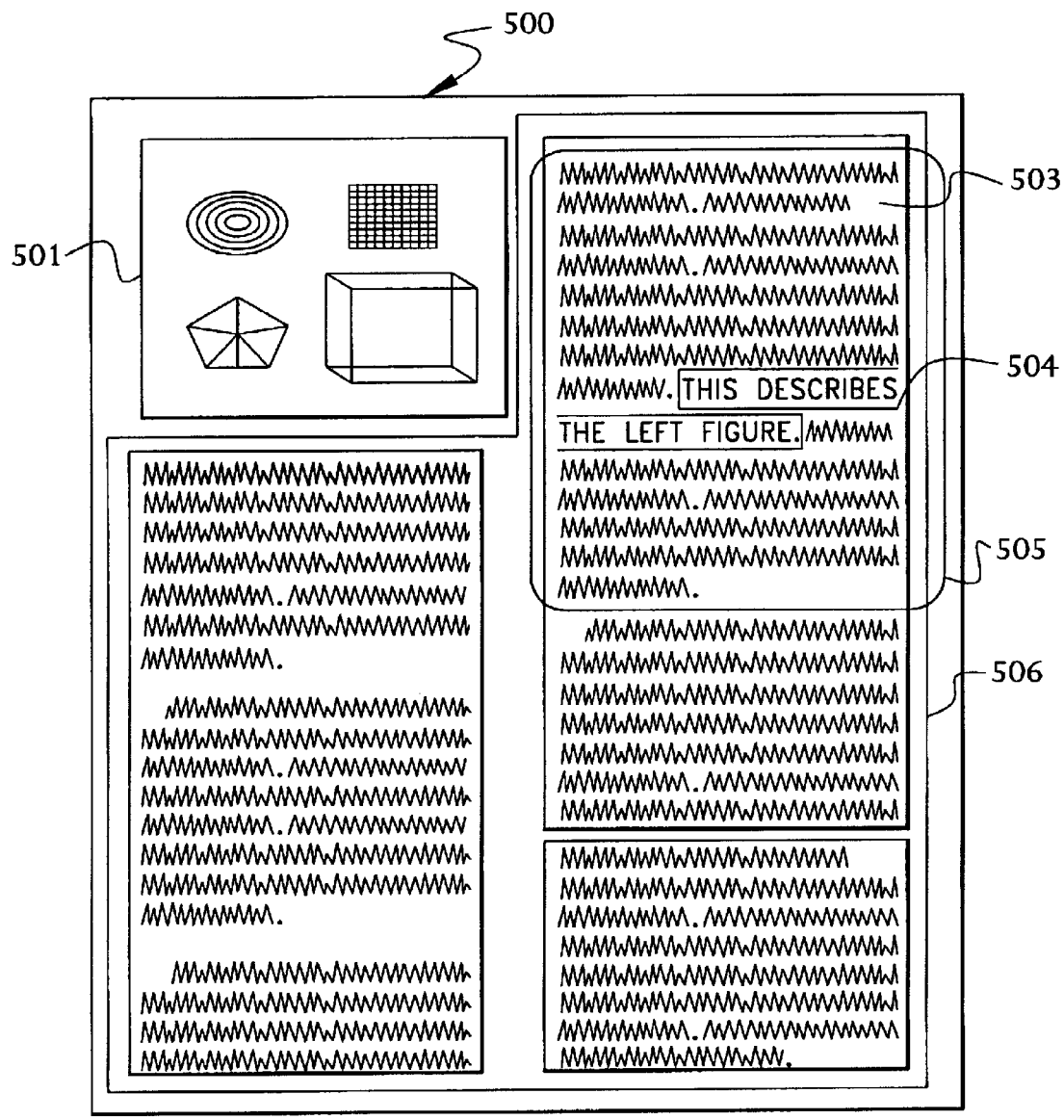
FIG. 8 is an exemplary document image which includes an image area but lacks a caption or legend area.

To diagramatically illustrate steps of a another preferred process for generating the image/text database according to the current invention, referring to FIG. 8, a document image 500 includes an image area 501 but lacks a caption or legend area. In this document, the image area 501 includes some geometric figures and is described in a main text area 503. To refer to the image area 501, a sentence in the main text area 503 reads "[t]his describes the left figure" in a sentence 504. The sentence is thus considered as a key sentence while a paragraph and a page containing the key sentence are respectively considered as a key paragraph 505 and a key page 500. The image area 501 which is the closest to the key paragraph 505 is associated with the above described key text.

Figure 9:
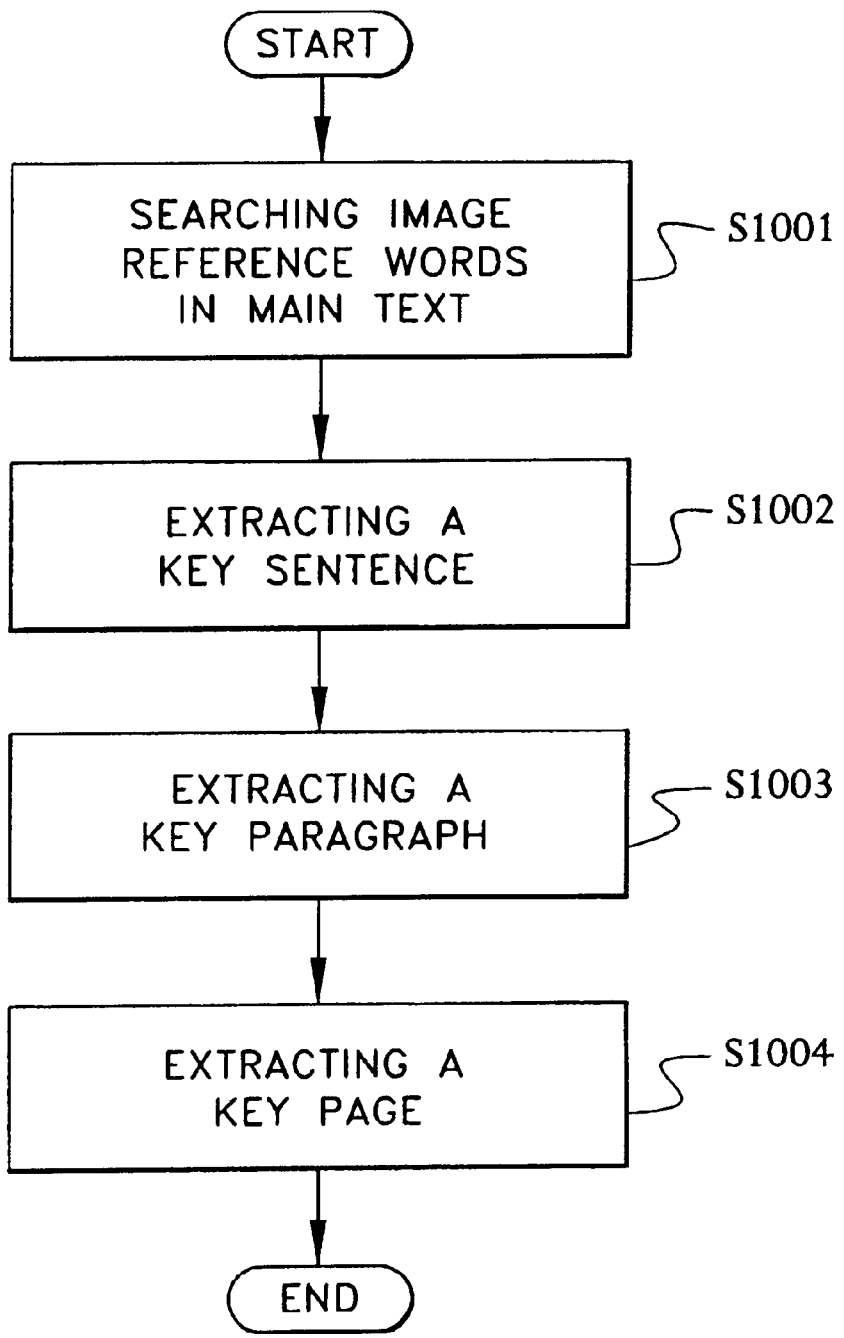
FIG. 9 illustrates some steps involved in the reference word searching process.

Referring to FIG. 9, some steps involved in the reference word searching process are described in a flow chart. Steps in one preferred method of the reference word searching according to the current invention involves a predetermined set of checks before the key text is extracted. A set of predetermined image reference words is stored for comparison. These image reference words include a relative reference such as "right" and an image type such as "figure." Other relative references include "left," "above," "below," "last page," "next page," and "current page. "The relative references and the image types are separately stored in one embodiment while they are combined and enumerated in another embodiment. In a step 1001, the predetermined image reference words are searched in main text. When there is a match, a sentence containing the image reference words is extracted as a key sentence in a step 1002. Similarly, a paragraph and a page containing the key sentence are respectively considered as a key paragraph and a key page in steps 1003 and 1004s.

Figure 10:
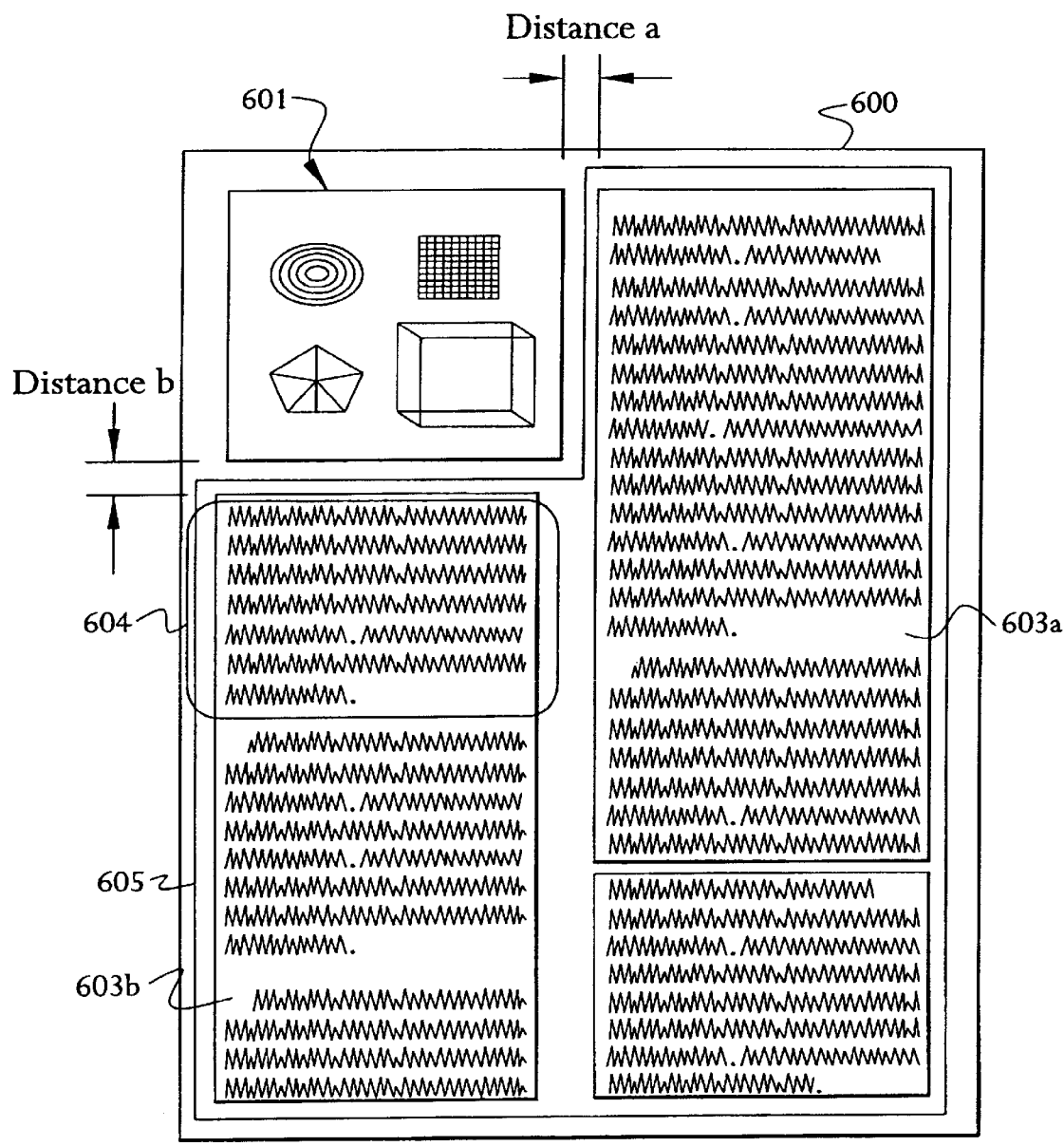
FIG. 10 illustrates an exemplary document image which includes an image area but lacks a caption area and any explicit reference to the image area.

To diagramatically illustrate steps of a yet another preferred process for generating the image/text database according to the current invention, referring to FIG. 10, a document image 600 includes an image area 501 and lacks not only a caption area but also any explicit reference to the image area. To determine key text for the image area 601, a distance to adjacent paragraphs is measured in the number of pixels. In this exemplary document image 600, a vertical distance b to a first adjacent text area 604 and a horizontal distance a to a second adjacent text area 603*a* are indicated. The measure distance is compared to determine the shortest distance, and the text area 604 is determined to be the closest to the image area 601. If the text includes two paragraphs that are separated by a separator, the distance is calculated to be longer.

Figure 11:
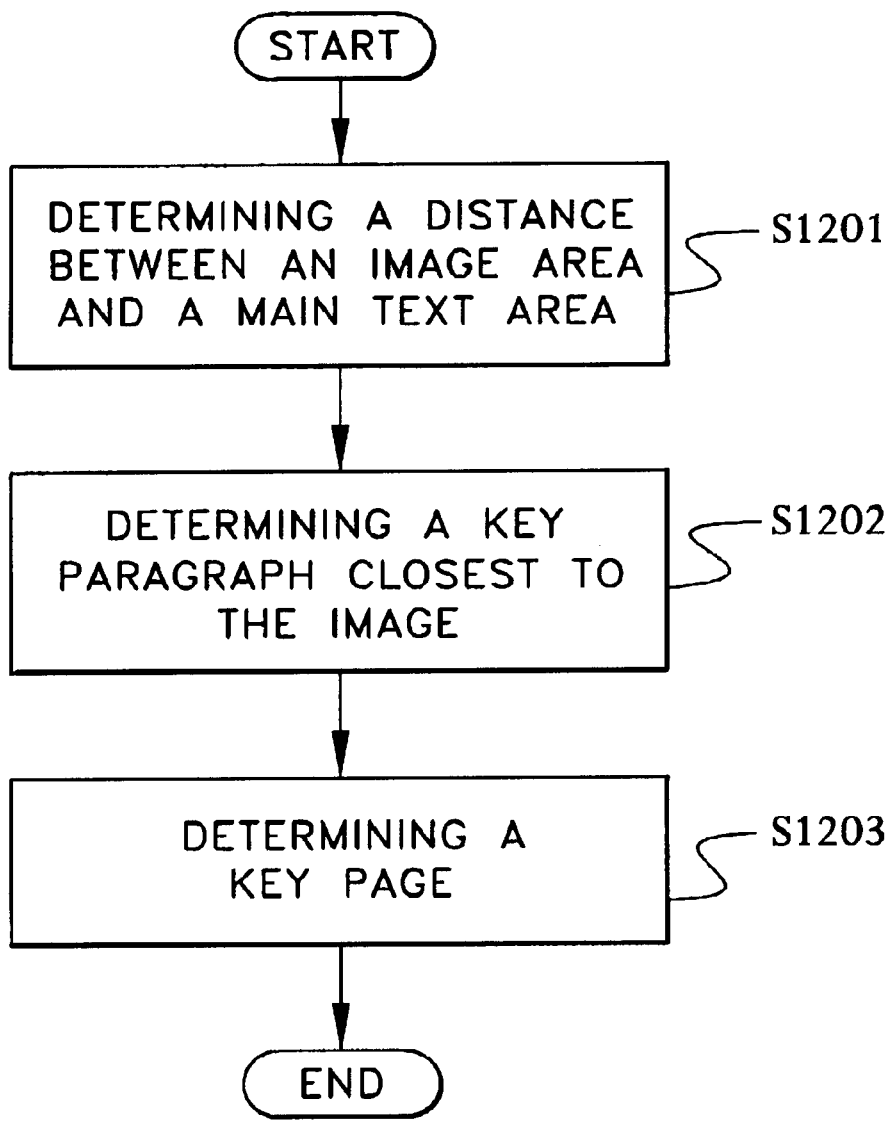
FIG. 11 is a flow chart illustrating some steps involved in the key paragraph determination process.

Referring to FIG. 11, some steps involved in the key paragraph determination process are described in a flow chart. One preferred method of identifying the key paragraph according to the current invention involves a step 1201 of determining a distance between an image area and each of adjacent text areas. Since neither a caption nor an image reference word exists, the closest text area is assumed to contain relevant information on the image. In a step 1202, the most closely located adjacent text area is determined based the shortest distance to the image area. Lastly, in a step 1202, a key page is determined.

Figure 12:
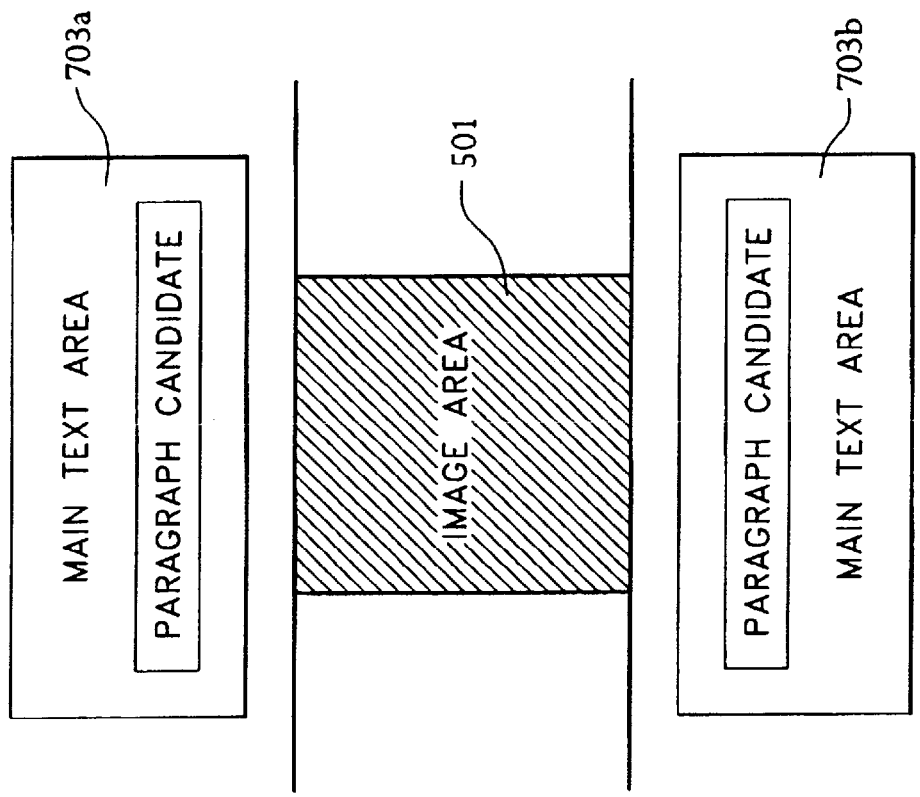
FIG. 12 further illustrates vertically adjacent text areas for determining a key paragraph.
Figure 13:
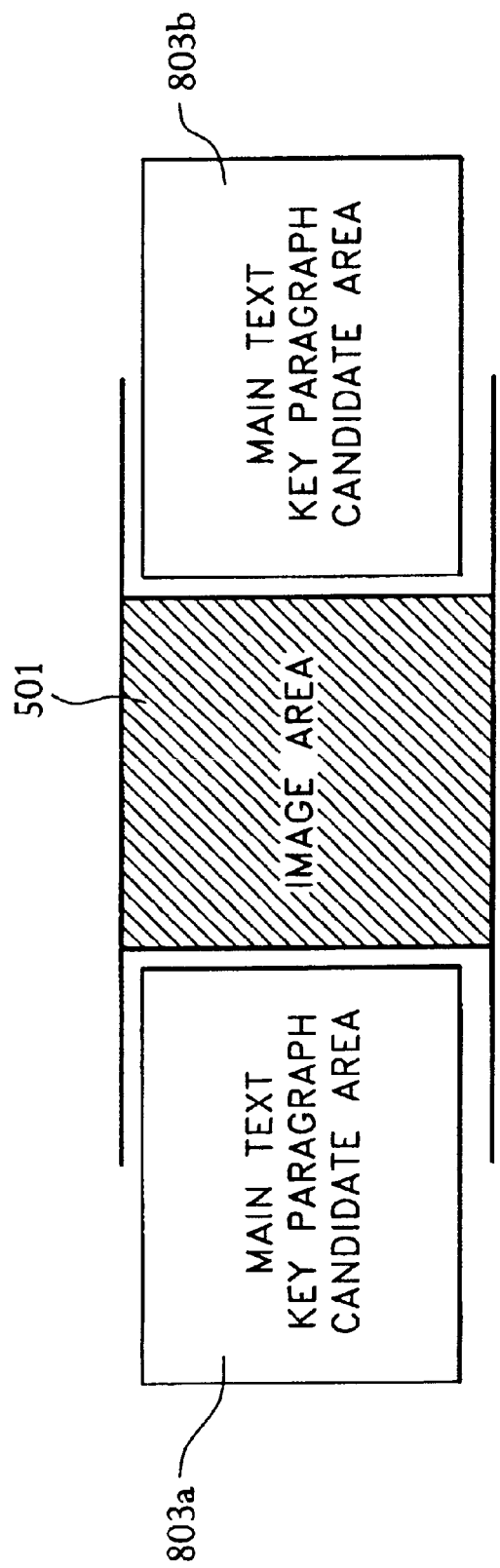
FIG. 13 further illustrates horizontally adjacent text areas for determining a key paragraph.

To determine a key paragraph, FIGS. 12 and 13 respectively illustrate vertically and horizontally adjacent text areas. Referring to FIG. 12, the vertically adjacent text areas 703*a* and 703*b* each contain at least one paragraph. After the most closely located text area is determined based upon a vertical distance to the image area, if multiple paragraphs exist in the most closely located text area, the most closely located paragraph is selected as a key paragraph. If the distance to two adjacently located text areas is the same, key paragraphs from both text areas are extracted. Referring to FIG. 13, the horizontally adjacent text areas 803*a* and 803*b* each contain at least one paragraph. After the most closely located text area is determined based upon a horizontal distance to the image area, if multiple paragraphs exist in the most closely located text area, all of the multiple paragraphs are selected as key paragraphs.

Figure 14:
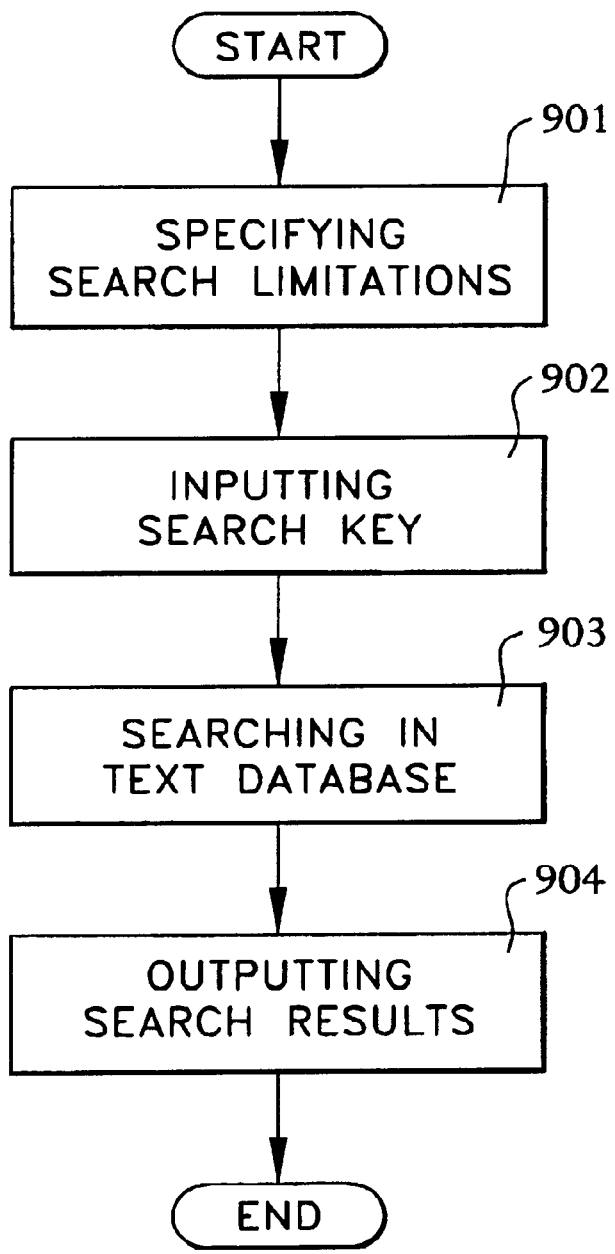
FIG. 14 is a flow chart illustrating general steps in one method of retrieving an image from the above described image/text database according to the current invention.

Now referring to FIG. 14, general steps in one method of retrieving an image from the above described image/text database according to the current invention are illustrated. In a step 901, a search limit is specified. That is, for example, a search is limited to a scope within key paragraphs. However, it is possible to combine limitations of captions, key sentences, key paragraphs, and key pages. The search limit should be set based upon search purposes. If inclusive search results are desired, a broad scope of search should be specified by selecting the key page database. On the other hand, if a narrow search is desired, the caption database is specified. In a step 902, a search word or a search phrase is inputted. The steps 901 and 902 may be reversed in order. Based upon the search limitation and the search word, a textual search is performed in the text database. When there is a plurality of matches, every match is stored in a list. The matched results include both textual information as well as associated image information. The matched images are thus sorted by their relevancy of the textual information. Lastly, the search results are outputted in a step 904.

Figure 15:
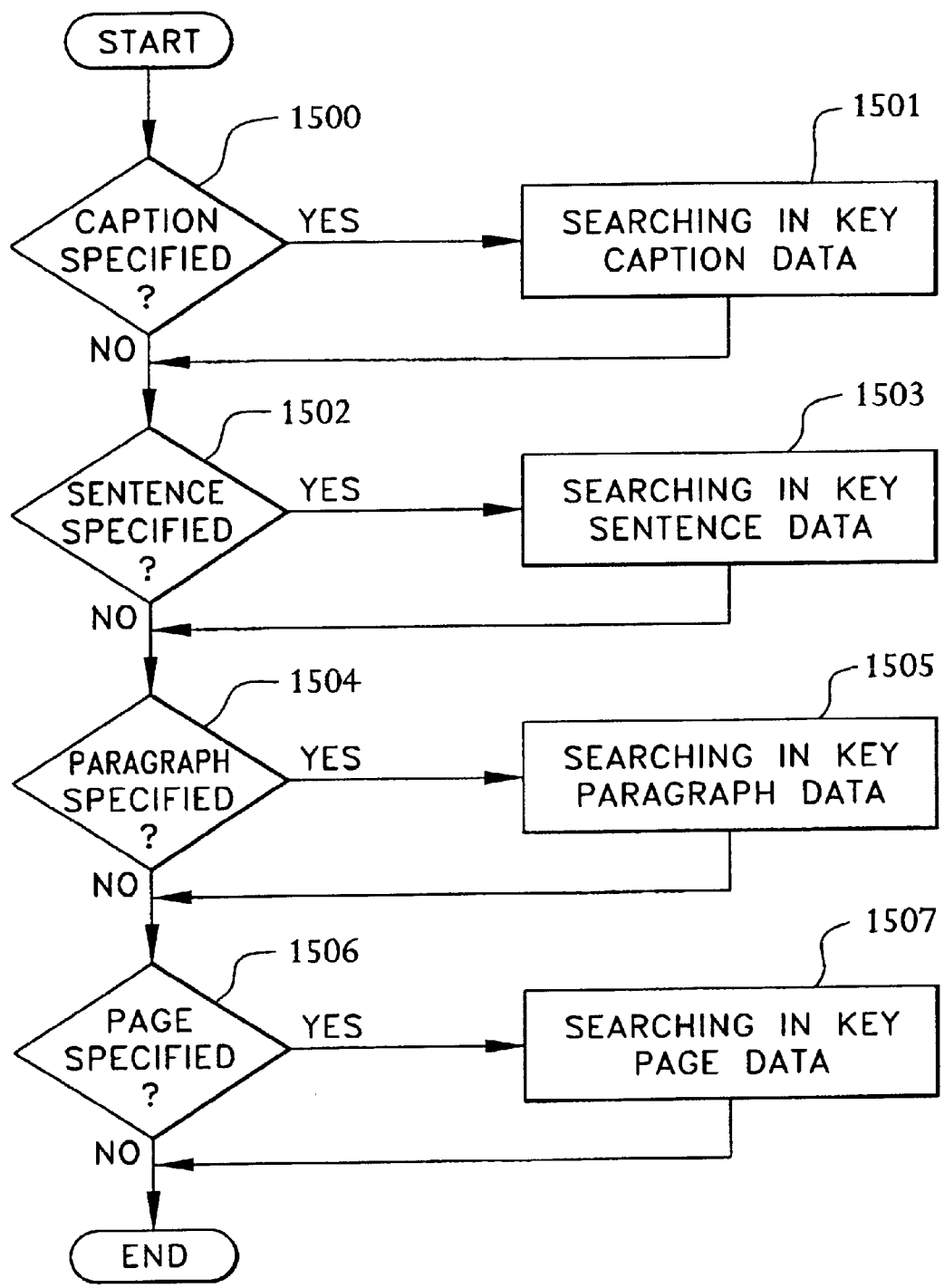
FIG. 15 is a flow chart illustrating general steps for outputting the search results.

Now referring to FIG. 15, in order to display the search result, general steps for outputting the search results are illustrated in a flow chart. The output process includes both outputting to a display unit as well as other output devices including printers and communication devices. In a step 1500, it is determined whether a caption has been specified for the search. If the caption portion of the text database is searched, the matched caption data is outputted in a caption column in a step 1501. Similarly, in a step 1502, it is determined whether a key sentence has been specified for the search. If the key sentence portion of the text database is searched, the matched key sentence data is outputted in a key sentence column in a step 1503. In steps 1504 and 1506, it is respectively determined whether a key paragraph and a key page have been specified for the search. If either of these portions of the text database is searched, the matched key paragraph and or key page data is outputted in a corresponding column in steps 1505 and 1507.

Figure 16:
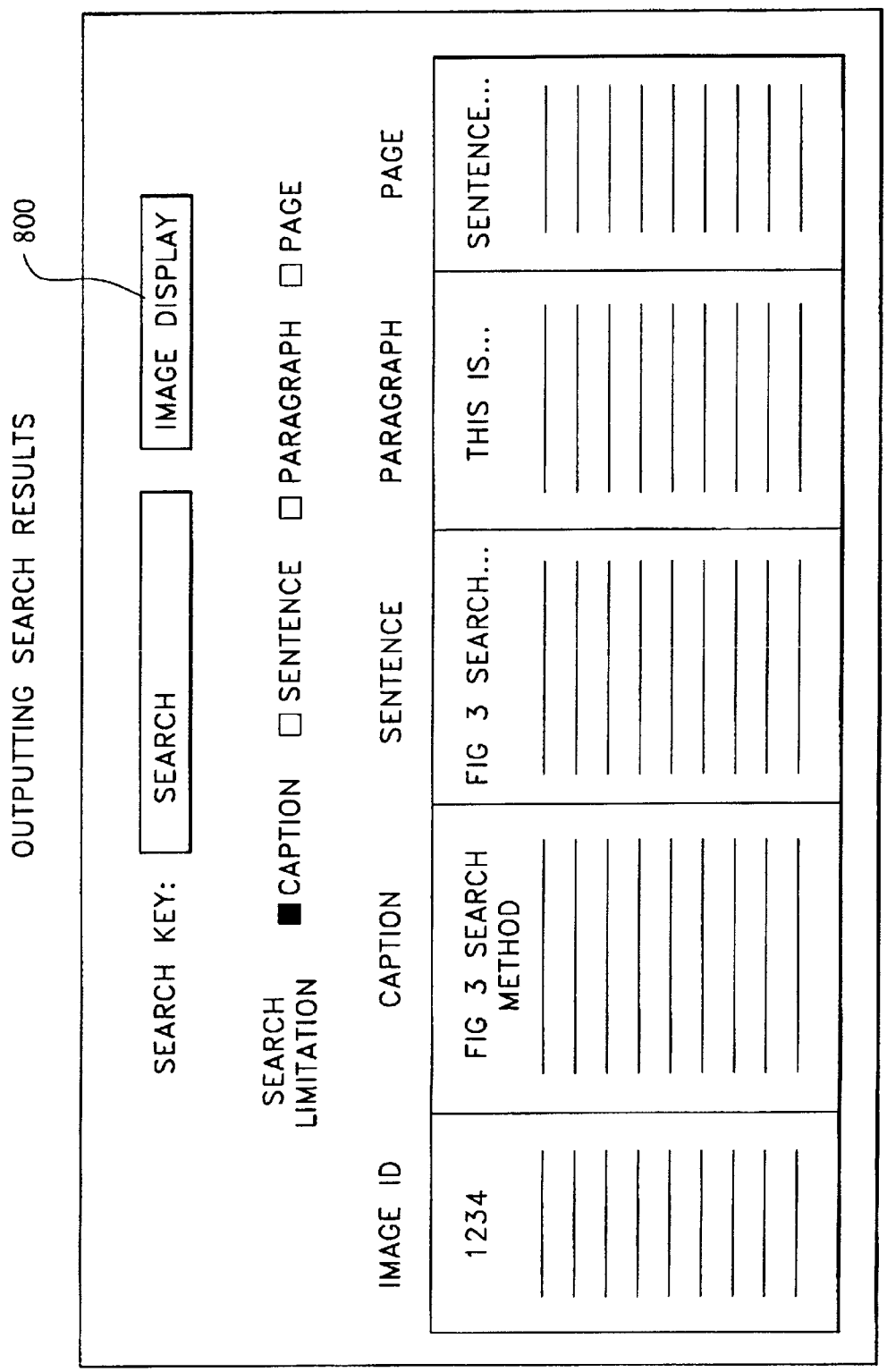
FIG. 16 illustrates one example of the search result output.

FIG. 16 illustrates one example of the search result output. The output is made to a display monitor or an image-carrying medium such as paper. The search result output includes a search word that is used for the current search, a search limitation, and match results. In this example, "caption" has been selected for a text database search. The match results include an image ID number, a match caption column, a matched key sentence column, a matched key paragraph column and a matched key page column. Each of these columns holds information on a beginning portion of the matched key text. It is optional to output any combined portions of the above described columns. The display version of the search result output additionally includes an image display button which indicates an option for further displaying a thumbnail images of the selected images.

Figures 17, 20:
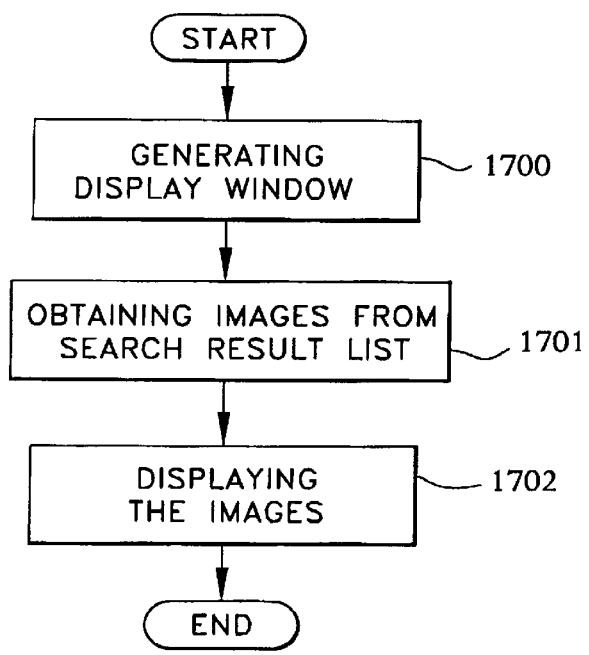
FIG. 17 illustrates steps involved in outputting the thumbnail images.
FIG. 20 illustrates another exemplary display window.
Figure 18:
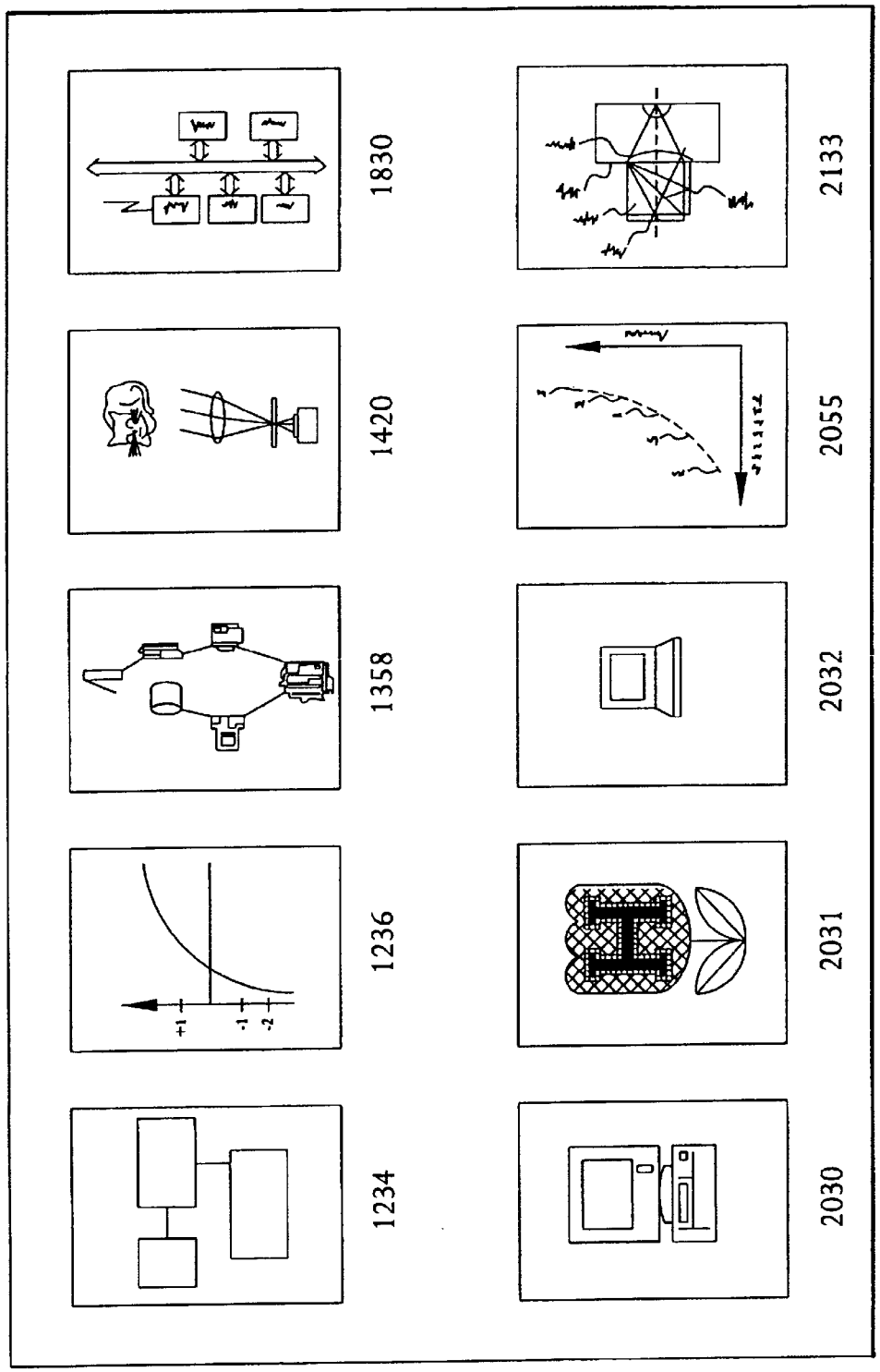
FIG. 18 illustrates an exemplary display window.

FIGS. 17 and 18 respectively illustrate steps involved in outputting the thumbnail images and an exemplary display window. Referring to FIG. 17, in a step 1700, a display window is generated. In a step 1701, the thumbnail image data is obtained from a search result list which linked to the image and text databases. Lastly, in a step 1702, the reduced images are outputted in the display window. Now referring to FIG. 18, exemplary thumbnail images are displayed with corresponding image ID's. Each of these images are sufficiently large to determine whether any of the images is one that is searched. The thumbnail images are also combined with the text search results in other examples.

By selecting an image ID as shown in FIG. 17 and a thumbnail image as shown in FIG. 18, a full-size associate image is optionally shown with a corresponding entire document image. By providing other links when those images are registered, other images and pages are also optionally later retrieved.

Figure 19:
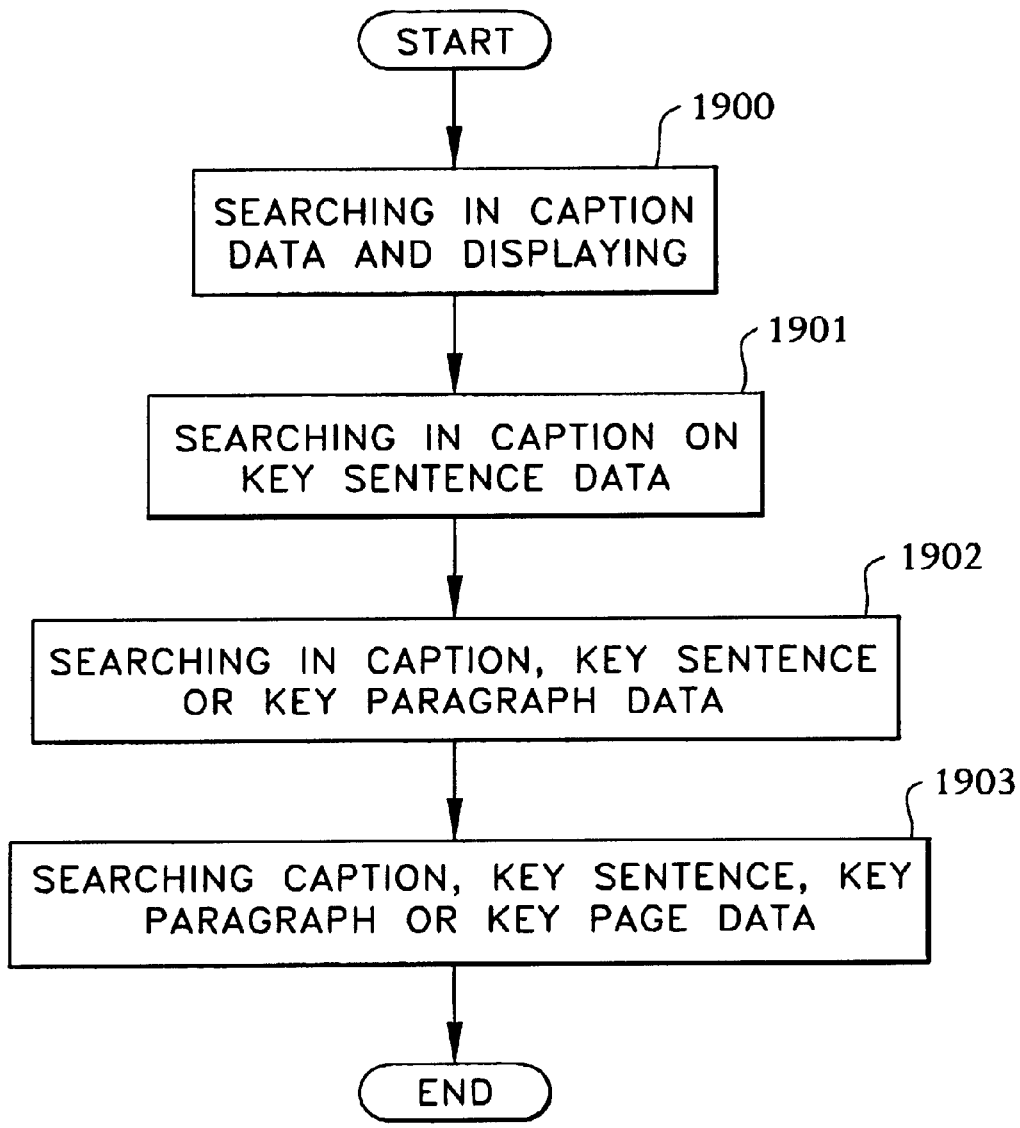
FIG. 19 illustrates steps involved in outputting alternative search results.

FIGS. 19 and 20 respectively illustrate steps involved in outputting alternative search results and an exemplary display window. Referring to FIG. 19, in a step 1900, a search is performed in caption data, and the result is outputted in a caption column. In a step 1901, a search is performed in caption and key sentence data, and the result is logically "OR"ed before being outputted to a key sentence column. In a step 1902, a search is performed in caption, key sentence and key paragraph data, and the result is logically "OR"ed before being outputted to a key paragraph column. Lastly, in a step 1903, a search is performed in caption, key sentence, key paragraph and key page data, and the result is logically "OR"ed before being outputted to a key page column. FIG. 20 illustrates the above described output format.

Figure 21:
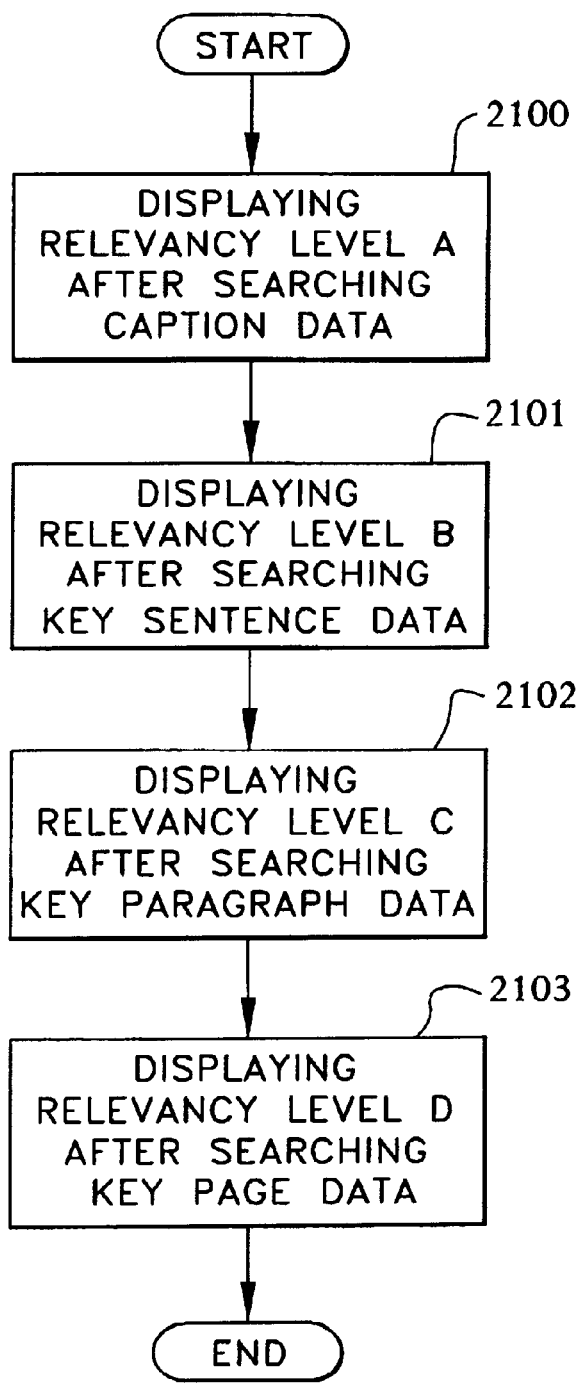
FIG. 21 illustrates steps involved in outputting yet alternative search results.
Figure 22:
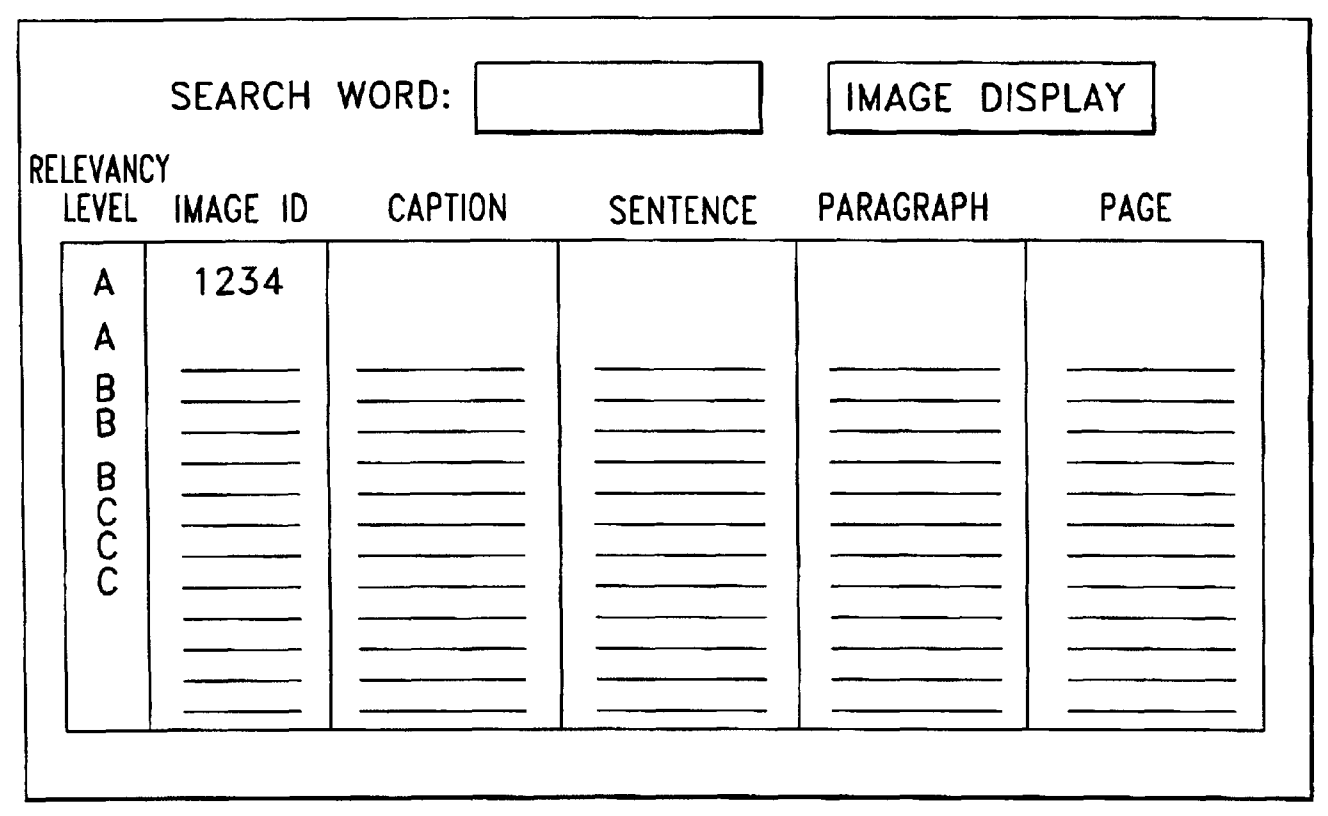

FIGS. 21 and 22 respectively illustrate steps involved in outputting another alternative search results and an exemplary display window. Referring to FIG. 21, in a step 2100, a search is performed in caption data, and the result is outputted as a relevancy level A. In a step 2101, a search is performed in key sentence data, and the result is outputted as a relevancy level B if the image is not yet listed in the output. In a step 2102, a search is performed in key paragraph data, and the result is outputted as a relevancy level C if the image is not yet listed in the output. Lastly, in a step 2103, a search is performed in key page data, and the result is outputted as a relevancy level D if the image is not yet listed in the output. FIG. 22 illustrates the above described output format.

In an alternative embodiment of the system for generating and searching an image database according to the current invention, the key text additionally includes an image type such as a block diagram, a flow chart etc.; an image size; an image characteristic such as color information; as well as a text image within an image area. In yet another preferred embodiment, the key text additionally includes a chapter header, a paragraph header, a page header, and a page footer. To include this additional information, the text is analyzed in detail.

Other alternative embodiments group certain images into a group when they are registered in an image database. When the group of the images is retrieved, a further selection is made within the group of the images. The above image grouping is made based upon a type of image, a type of text, and other user defined conditions. Alternative embodiments also include predetermined key text extraction rules for extracting key text. The extraction rules may be activated by a user. In addition, a single key sentence may be associated with multiple images, and each association has a weight. Accordingly, the images are displayed with the associated weight. Lastly, certain words in text are known to be erroneously recognized in the optical recognition process. To prevent these erroneously recognized words from being used in determining key text, those known words are corrected after the optical recognition process.

It is to be understood, however, that even though numerous characteristics and advantages of the present invention have been set forth in the foregoing description, together with details of the structure and function of the invention, the disclosure is illustrative only, and that although changes may be made in detail, especially in matters of classification for relevancy, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating a database for images, comprising:

inputting input document data containing text data and image data, the image data further including images;

selecting relevant text portions of the text data according to predetermined degrees of hierarchical relevancy for each of the images, the predetermined degrees of the hierarchical relevancy each defining a level of relevance in reference to the images; and storing the relevant text portions and the images in a predetermined hierarchical order based upon the predetermined degrees of the hierarchical relevancy.

2. The method of generating a database for images according to claim 1 wherein the images include a table, a picture, a diagram and a figure.

3. The method of generating a database for images according to claim 1 wherein the relevant text portions include a caption, a key sentence, a key paragraph and a key page.

4. The method of generating a database for images according to claim 1 further comprising searching one of the images based upon a search word.

5. The method of generating a database for images according to claim 4 wherein said searching further comprises:

inputting the search word;

comparing the search word to each of the relevant text portions for a match; and outputting the match.

6. The method of generating a database for images according to claim 5 further comprising specifying a search limit in the relevant text portions.

7. The method of generating a database for images according to claim 6 further comprising determining a relevancy degree when there are multiple ones of the relevant text portions prior to outputting the match.

8. The method of generating a database for images according to claim 5 wherein outputting the match with corresponding ones of the images when there are multiple ones of the relevant text portions.

9. The method of generating a database for images according to claim 8 wherein the predetermined degrees of the hierarchical relevancy are outputted with the corresponding ones of the images.

10. The method of generating a database for images according to claim 5 wherein the predetermined degrees of the hierarchical relevancy are determined by a distance to the images.

11. A system for generating a database for images, comprising:

an input unit for inputting input document data containing text data and image data, the image data further including images;

a processing unit connected to said input unit for selecting relevant text portions of the text data according to predetermined degrees of hierarchical relevancy for each of the images, the predetermined degrees of the hierarchical relevancy each defining a level of relevance in reference to the images; and a storage unit connected to said processing unit for storing the relevant text portions and the images in a predetermined hierarchical order based upon the predetermined degrees of the hierarchical relevancy.

12. The system for generating a database for images according to claim 11 wherein the images include a table, a picture, a diagram and a figure.

13. The system for generating a database for images according to claim 11 wherein said processing unit selects the relevant text portions including a caption, a key sentence, a key paragraph and a key page.

14. The system for generating a database for images according to claim 11 further comprising a search unit connected to said storage unit for searching one of the images based upon a search word.

15. The system for generating a database for images according to claim 14 wherein said search unit further comprises a search word input sub-unit for inputting the search word, a comparison sub-unit for comparing the search word to each of the relevant text portions for a match, and an output sub-unit connected to said comparison sub-unit for outputting the match.

16. The system for generating a database for images according to claim 15 wherein said search word input sub-unit specifies a search limit in the relevant text portions.

17. The system for generating a database for images according to claim 16 wherein said search unit further comprises a relevancy determination unit for determining a relevancy degree when there are multiple ones of the relevant text portions prior to outputting the match.

18. The system for generating a database for images according to claim 15 wherein said output sub-unit outputs the match with corresponding ones of the images when there are multiple ones of the relevant text portions.

19. The system for generating a database for images according to claim 18 wherein said output sub-unit outputs the predetermined hierarchical degrees of the relevancy with the corresponding ones of the images.

20. The system for generating a database for images according to claim 15 wherein said processing unit determines the predetermined hierarchical degrees of the relevancy based upon a distance to the images.

21. A recording medium containing a computer program for generating a database for images, the computer program comprising the steps of:

inputting input document data containing text data and image data, the image data further including images;

selecting relevant text portions of the text data according to predetermined degrees of hierarchical relevancy for each of the images, the predetermined degrees of the hierarchical relevancy each defining a level of relevance in reference to the images; and storing the relevant text portions and the images in a predetermined hierarchical order based upon the predetermined degrees of hierarchical relevancy.

* * * * *